United States Patent
Wilhide et al.

(10) Patent No.: US 10,931,129 B2
(45) Date of Patent: Feb. 23, 2021

(54) HYBRID ENERGY STORAGE MODULE VOLTAGE REGULATION

(71) Applicant: Hamilton Sundstrand Corporation, Charlotte, NC (US)

(72) Inventors: Matthew L. Wilhide, Cherry Valley, IL (US); William S. Heglund, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 414 days.

(21) Appl. No.: 15/956,915

(22) Filed: Apr. 19, 2018

(65) Prior Publication Data

US 2019/0326763 A1 Oct. 24, 2019

(51) Int. Cl.
*H02J 7/00* (2006.01)
*H02M 1/44* (2007.01)

(52) U.S. Cl.
CPC ............ *H02J 7/0063* (2013.01); *H02M 1/44* (2013.01); *H02J 2007/0067* (2013.01)

(58) Field of Classification Search
CPC .................................................. H02J 7/0063
USPC ........................................................ 320/135
See application file for complete search history.

(56) References Cited

U.S. PATENT DOCUMENTS

| 9,230,748 | B1* | 1/2016 | Semrau | H02J 7/345 |
| 9,889,752 | B2 | 2/2018 | Zhou | |
| 2010/0305792 | A1* | 12/2010 | Wilk | B60L 58/26 |
| | | | | 701/22 |
| 2013/0116889 | A1 | 5/2013 | Zhang et al. | |
| 2015/0148973 | A1 | 5/2015 | Ye et al. | |
| 2015/0194820 | A1* | 7/2015 | Liang | H02J 1/10 |
| | | | | 320/134 |
| 2016/0096437 | A1* | 4/2016 | Tripathi | H02J 3/381 |
| | | | | 307/31 |
| 2019/0199094 | A1* | 6/2019 | Kuznetsov | H02J 3/30 |

OTHER PUBLICATIONS

Extened European Search Report for Application No. 19168937.1-1205, dated Sep. 13, 2019, 8 pages.

* cited by examiner

*Primary Examiner* — Jerry D Robbins
(74) *Attorney, Agent, or Firm* — Cantor Colburn LLP

(57) ABSTRACT

Embodiments include systems, methods, and devices for voltage regulation of a hybrid energy storage module (HESM). The embodiments include a system controller including a first voltage regulator and a second voltage regulator, a first HESM coupled to the system controller, where the first HESM is coupled to a first bus, and a second HESM coupled to the system controller, where the second HESM is coupled to a second bus, and the first bus and the second bus are different.

20 Claims, 3 Drawing Sheets

300

302 Sensing a first output of a first hybrid energy storage module (HESM) coupled to a first bus, wherein the first HESM comprises a plurality of energy storage devices

↓

304 Sensing a second output of a second HESM coupled to a second bus, wherein the second HESM comprises a plurality of energy storage devices, wherein the first bus and the second bus are different

↓

306 Regulating the first and second buses based at least in part on sensing the first and second outputs

FIG. 3

HYBRID ENERGY STORAGE MODULE VOLTAGE REGULATION

BACKGROUND

The present disclosure relates generally to voltage regulation, and more specifically to hybrid energy storage module (HESM) voltage regulation, such as those used on aircrafts and other vehicles.

In today's environment, energy storage systems are used in a variety of applications such as back-up systems or alternative energy sources. Energy storage systems can include different types of energy storage types. For example, back-up systems may include a plurality of the same energy device type. In another example, hybrid systems, such as hybrid automobiles, can have different energy types including fuel and batteries to alternate between the two energy sources. The types of energy storage devices can be selected based on its application. For example, some applications may require repetitive loads while others may require intermittent bursts of large pulse loads.

BRIEF DESCRIPTION

According to one embodiment, a system for voltage regulation of a hybrid energy storage module (HESM) is provided. The system includes a system controller including a first voltage regulator and a second voltage regulator, a first HESM coupled to the system controller, wherein the first HESM is coupled to a first bus, and a second HESM coupled to the system controller, wherein the second HESM is coupled to a second bus, wherein the first bus and the second bus are different.

In addition to one or more of the features described above, or as an alternative, further embodiments may include wherein the first HESM includes one or more energy storage devices, one or more converters, and a first power filter, and wherein the second HESM includes one or more energy storage devices, one or more converters, and a second power filter.

In addition to one or more of the features described above, or as an alternative, further embodiments may include wherein the system controller includes a first and second voltage regulator, a first and second current allocator, and a trim command module, wherein the trim command module is coupled to the first voltage regulator and the second voltage regulator.

In addition to one or more of the features described above, or as an alternative, further embodiments may include wherein the first voltage regulator regulates a voltage of the first bus independently of the second voltage regulator that regulates a voltage of the second bus.

In addition to one or more of the features described above, or as an alternative, further embodiments may include wherein one or more energy storage devices of the first HESM include different energy storage types and one or more energy storage devices of the second HESM include different energy storage types.

In addition to one or more of the features described above, or as an alternative, further embodiments may include wherein the first bus and the second bus are positive and negative rails of the system, respectively.

In addition to one or more of the features described above, or as an alternative, further embodiments may include wherein a voltage of the first bus is different than a voltage of the second bus.

According to another embodiment, a method for regulating a voltage of a hybrid energy storage module (HESM) system is provided. The method includes sensing a first output of a first HESM coupled to a first bus, wherein the first HESM includes a plurality of energy storage devices, sensing a second output of a second HESM coupled to a second bus, wherein the second HESM includes a plurality of energy storage devices, wherein the first bus and the second bus are different, and regulating the first and second buses based at least in part on sensing the first and second outputs.

In addition to one or more of the features described above, or as an alternative, further embodiments may include wherein sensing the first output and the second output include sensing a current and voltage for the first output and the second output.

In addition to one or more of the features described above, or as an alternative, further embodiments may include wherein regulating the first bus and second bus include sending a first signal to control one or more converters coupled to one or more energy storage devices of the first HESM and sending a second signal to control one or more converters coupled to one or more energy storage devices of the second HESM.

In addition to one or more of the features described above, or as an alternative, further embodiments may include wherein the first bus is a positive rail and the second bus is a negative rail.

In addition to one or more of the features described above, or as an alternative, further embodiments may include wherein the first bus is operating at a first voltage and the second bus is operating at a second voltage, wherein the first voltage is different than the second voltage.

In addition to one or more of the features described above, or as an alternative, further embodiments may include wherein a first voltage regulator and a second voltage regulator receive commands from a common trim command module, wherein the commands are based on a state of charge of the plurality of energy storage devices of the first HESM and the second HESM.

In addition to one or more of the features described above, or as an alternative, further embodiments may include wherein the commands of the command trim module are based on a state of charge of the plurality of energy storage devices and a current command signal.

According to a different embodiment, a voltage regulator system of a hybrid energy storage module (HESM) system is provided. The voltage regulator system includes a voltage regulator system having a first voltage regulator and a second voltage regulator, wherein the first voltage regulator includes an interface coupled to a first power filter, an interface coupled to a first a current allocator, and an interface coupled to a trim module for receiving a voltage adjustment command. The voltage regulator system also includes wherein the second voltage regulator includes an interface coupled to a second power filter, an interface coupled to a second current allocator, and an interface coupled to the trim module to receive a voltage adjustment command.

In addition to one or more of the features described above, or as an alternative, further embodiments may include wherein the first voltage regulator regulates an output of a first HESM and the second voltage regulator regulates an output of a second HESM.

In addition to one or more of the features described above, or as an alternative, further embodiments may include wherein the first HESM includes a plurality of energy storage devices, a first power filter, and a first current allocator, and wherein the second HESM includes a plurality of energy storage devices, a second power filter, and a second current allocator In addition to one or more of the features described above, or as an alternative, further embodiments may include wherein the plurality of energy storage devices for the first HESM and second HESM include different types of energy storage devices.

In addition to one or more of the features described above, or as an alternative, further embodiments may include wherein the first voltage regulator regulates a first bus voltage of the first HESM independently of the second voltage regulator that regulates a second bus voltage of the second HESM.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 3 depicts a flow chart for regulating a voltage of a HESM system in accordance with one or more embodiments of the invention.

DETAILED DESCRIPTION

Figure 1:
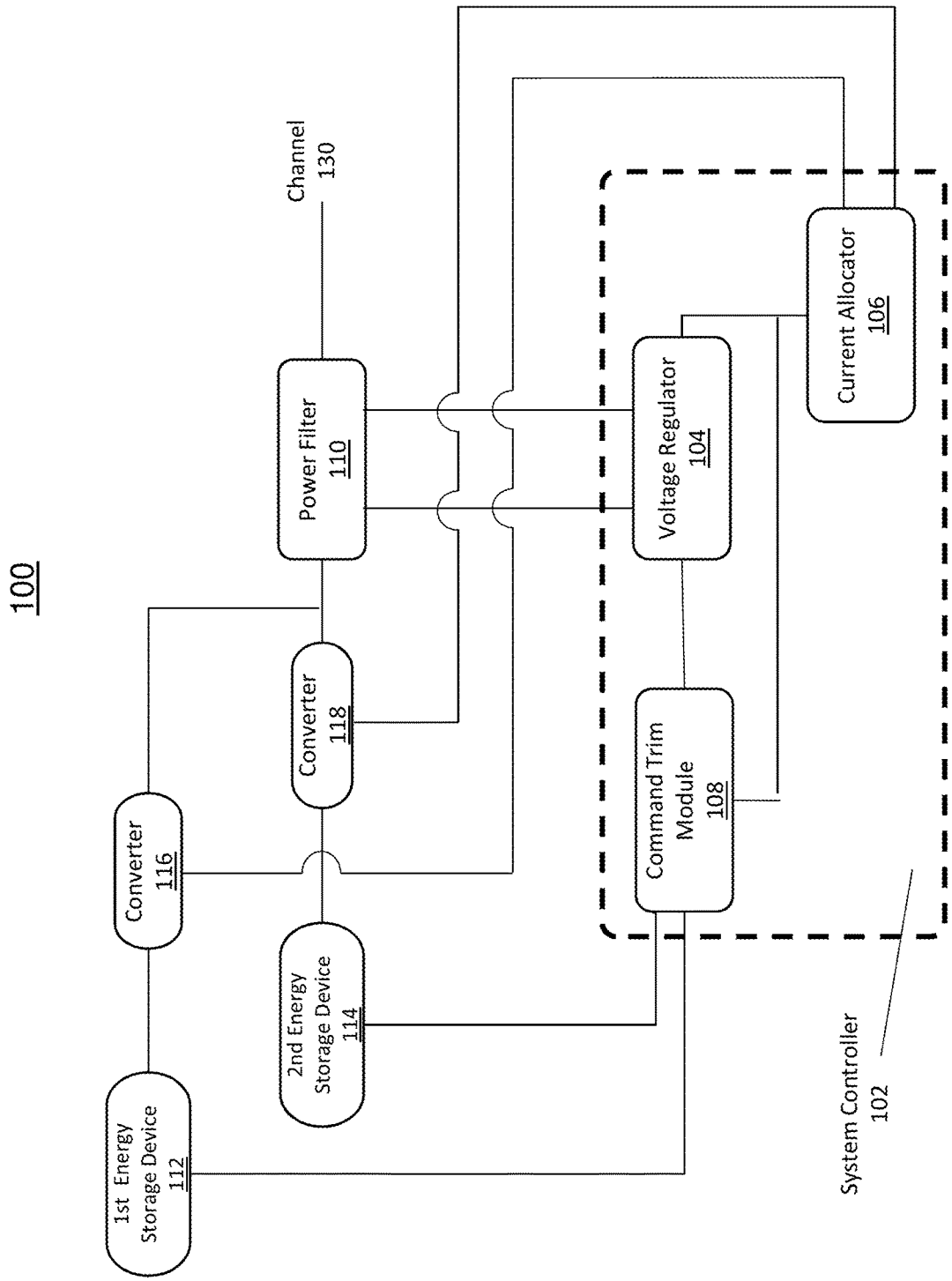
FIG. 1 depicts a system of an HESM operating a single channel.

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to hybrid energy storage modules (HESM) implemented in aircrafts, whereas the advantages of the present disclosure as applied in a related field would be apparent to one having ordinary skill in the art and are considered to be within the scope of the present invention.

In typical aircrafts, the voltage rails can range from 0 to 270 (V) volts. However, in today's environment, high voltage systems can use voltage rails ranging from −270 to +270 V. Without a balancing mechanism for the two halves of the bus, the total bus voltage would drift to one voltage rail and the opposing rail would drift to zero due to the internal impedance of each HESM, given that there is no active circuit maintaining the voltages for each rail. This imbalance can adversely affect power quality and potentially damage the electrically coupled components. Devices and systems, such as those used in aircraft systems require a steady source of power for stable operation which can be implemented through voltage regulation.

One or more configurations include coupling a plurality of HESMs while balancing the load of the positive and negative bus by implementing individual voltage regulators and current allocators to independently control the converters associated with the respective energy storage devices. Embodiments of the invention also include stacking HESMs in series having one module on the positive rail and another module on the negative rail.

In addition, one or more HESMs having two or more different energy storage types are controlled to balance the output of different buses. It is to be understood a system implementing two or more energy storage types are considered to be within the scope of the invention. A first energy storage type can include a battery-based energy storage type, and a second energy storage type can include a capacitor-based storage type such as super or ultra-capacitors. Without controlling and balancing the first HESM and the second HESM the total bus voltage will drift to a voltage of the highest energy storage device on the rail. By implementing independent voltage regulators the trim module is provided a means of adjusting the power that is sourced/sunk into respective energy storage devices. If a single voltage regulator was used, over time the normal efficiency differences between the first and second HESM can cause the state of charge of the positive rail energy storage devices and the negative rail energy storage devices to diverge leading to a potential overcharge failure. The techniques described herein, not only manage the load between one or more energy storage devices of a single HESM, but also maintain balance among the multiple HESMs by implementing a voltage regulation technique.

Now referring to FIG. 1, a system 100 depicting an HESM used for a single channel is shown. As shown in the system 100, it should be observed that the voltage regulation operates on a single channel 130 (aircraft bus) by monitoring the voltage and/or current observed at an output.

A system controller 102 includes one or more components for operating the HESM of FIG. 1. In a non-limiting example, the system controller 102 includes a voltage regulator 104, an energy storage unit (ESU) current allocator 106, and a command trim module 108. The system controller 102 has been simplified but it should be understood that other components, modules and circuit elements can be used in the configuration.

The voltage regulator 104 is configured to sense the current and the voltage at the power filter 110. Known voltage sense circuits and current sense circuits can be implemented into the system controller 102 to detect the state at the power filter 110. The voltage regulator 104 uses the sensed voltage and current information as an input to determine a current command to transmit to the current allocator 106. The voltage regulator 104 also determines the current command based on a signal received from the command trim module 108 which is discussed further below. In one or more embodiments, in order to regulate the voltage, a voltage control loop can be implemented using techniques such as PI loops for control systems.

The power filter 110 of FIG. 1 is located between the energy storage devices and the bus. Its function is to attenuate and remove any unwanted signals before being provided to the electronic devices/load to ensure a quality and predictable signal is delivered. The power filter 110 is configured to receive an input on a first interface from one or more energy storage devices 112, 114 and provide an output on a second interface coupled to a channel/bus 130. The output of the power filter 110 can be provided to a channel such as an aircraft bus. The power filter 110 is also configured to select the desired output from the first storage type and/or a second storage type and reduce any unwanted noise or signals from the output.

In the configuration shown in FIG. 1, the first energy storage type is a capacitor-based energy storage device. The first energy storage device 112 of the HESM is an ultracapacitor and is electrically coupled to a first converter 116. The converter 116 can be a DC/DC converter that converts a direct current source from one voltage to another voltage. The voltage can be stepped-up or stepped-down based on the requirements of its application. Known converters such as buck-boost configurations are considered within the scope of the invention. It is to be understood that the converter 116, 118 can be other types of converters such as AC/DC converters based on the implementation and design of the system.

Also shown in the HESM of FIG. 1 is a second energy storage type such as battery-based energy storage device. Battery-based energy storage devices can be composed of any of nickel, lithium, alkaline, etc. The second energy storage device 114 is a battery that is electrically coupled to a converter 118. Other embodiments of the invention can include more than two energy storage devices of different/same energy storage types such as fuel cell energy storage devices. In addition, each additional storage device can include the interfaces and appropriate connections to the system controller 102, converters and power filter 110.

The convertors 116, 118 are controlled by a command signal from the system controller 102. In one or more embodiments of the invention, the current allocator 106 provides a command signal to the first and second converters 116, 118 to control the duty cycle to affect the output of the converters 116, 118 providing energy to the power filter 110.

The voltage regulator 104 receives a voltage command adjust signal from the command trim module 108. The voltage regulator 104 is configured to provide an ESU current command signal to the current allocator 106 based on the received voltage command adjust signal, the sensed voltage and/or current from the power filter 110.

The current allocator 106 is configured to select the energy storage device for providing power to the output bus. Based on the current command signal from the voltage regulator 104, the current allocator 106 provides a first signal to a converter 116 coupled to the first energy storage device 112 to provide power to the output bus and/or the current allocator 106 provides a second signal to a converter 118 coupled to the second energy storage device 114 to provide power to the output. For example, based on the current command signal received from the voltage regulator 104, the current allocator 106 can send a command signal to the converter 116 associated with the ultracapacitor energy storage device to provide power to the output bus. Conversely, the current command signal received from the voltage regulator 104 can indicate to the current allocator 106 to send a command signal to the converter 118 associated with the battery energy storage device to provide power to the output bus. The current allocator 106 determines the type of load and provides a command to the converters 116, 118 respectively. In the event there is a high frequency pulse load the ultracapacitor receives the command or if there is a long energy pulse the battery receives the command. The ultracapacitors are used for repetitive loads and the batteries are used for energy dense loads.

The command trim module 108 is configured to control the charging and discharging of one or more energy storage devices by influencing the voltage regulator 104 to either increase or decrease the internal voltage of the system when compared to the bus. The command trim module 108 is configured to detect the state of charge (SoC) of the connected energy storage devices, such as the first and second energy storage devices 112, 114, the ultracapacitor and battery, respectively. In one or more embodiments of the invention, the SoC is a measurement of the voltage/current at the energy storage device. The command trim module 108 is also configured to detect the current command signal provided from the voltage regulator 104 to the current allocator 106. The feedback is used to modify the ultracapacitor command signal and the battery command signal. Trim controller 108 is configured to send a voltage adjustment signal to the voltage regulator 104 so the current command signal to the current allocator 106 can be appropriately adapted based on the SoC of the one or more energy storage devices. In this particular configuration of FIG. 1, the command trim module 108 regulates the SoC of the battery and ultracapacitor to ensure the energy storage devices can provide enough power to the bus when needed.

In one or more embodiments of the invention, a generator is coupled in parallel with the load of the HESM system. The HESM is used for various applications that exceed the capability of the generator and therefore supplements the power requested from the load. For example, in the event a high pulse load is experienced, the trim command module recognizes the energy storage devices have been discharged. In order to re-charge the energy storage devices, the trim command module provides a signal to adjust the internal voltage to a voltage below the aircraft bus voltage coupled to the load. Conversely, if a load of the aircraft bus requires peak power demands beyond the capabilities of the generator, the command trim signal will increase the voltage of the power filter to be above that of the aircraft bus to supply a source of power.

Figure 2:
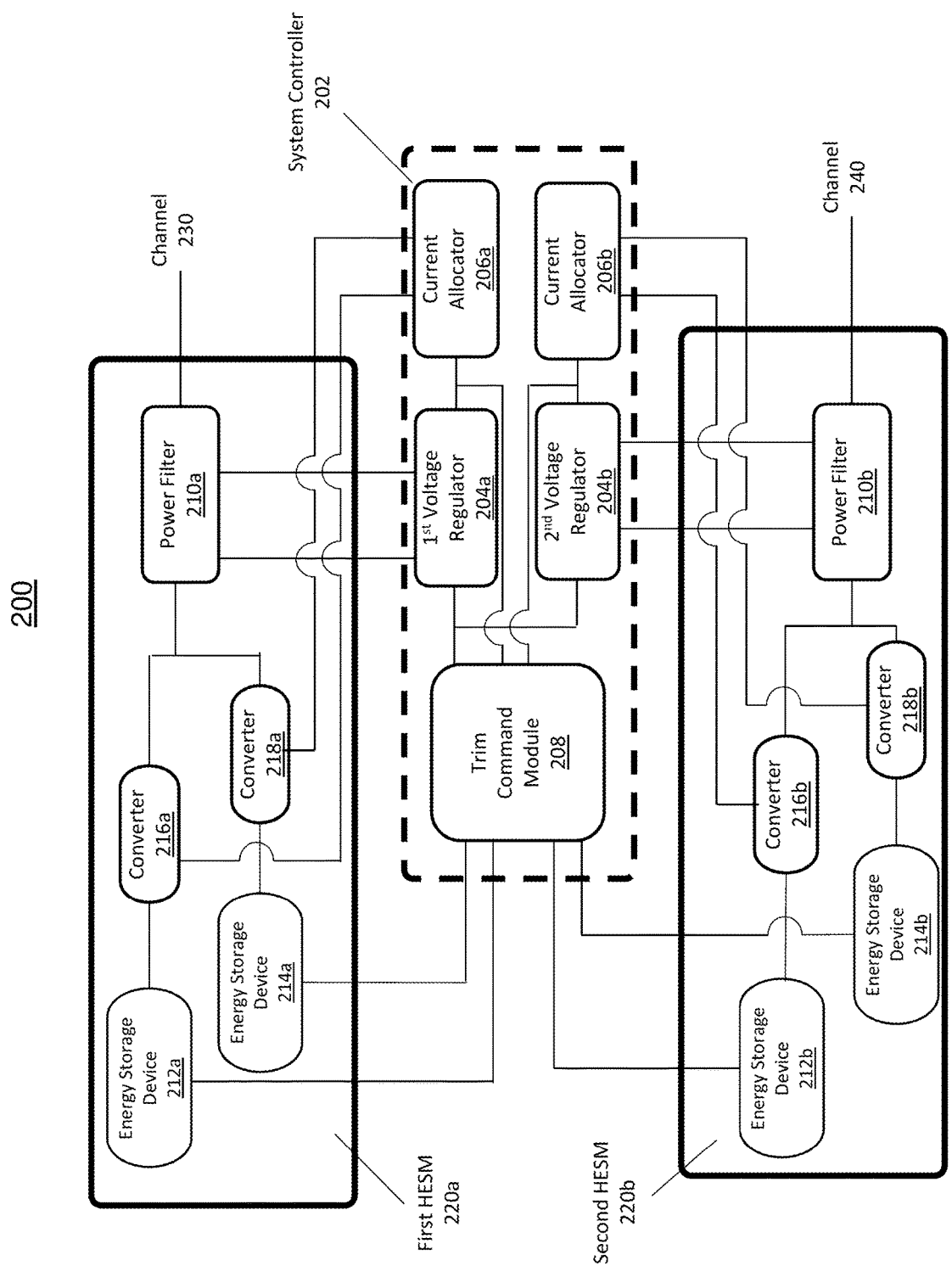
FIG. 2 depicts an HESM system operating two channels in accordance with one or more embodiments of the invention.

Now referring to FIG. 2, a diagram 200 depicting an HESM system in accordance with one or more embodiments of the invention is shown.

In the diagram 200, the HESM is divided into two channels 230, 240 with each channel servicing one rail of a high voltage bus as shown in FIG. 2. In one or more embodiments of the invention, the channels provide voltages ranging from −300 to +300 V. The system can be configured to provide higher and/or lower voltages based on its application. The system controller 202 is configured to include individual voltage regulators and current allocators to independently control the converters for the energy storage devices. Each of the voltage regulators monitor the voltage and/or current observed in respective power filters.

The system controller 202 is coupled to a first HESM 220a and a second HESM 220b. In other embodiments of the invention, two or more HESMs 220 can be coupled to one or more system controllers 202 and one or more buses. The first HESM 220a includes energy storage devices 212a, 214a and converters 216a, 218a. The first HESM 220a also includes a first power filter 210a which conditions the power provided on the positive (+) bus 230. The second HESM 220b includes energy storage devices 212b, 214b and converters 216b, 218b. The second HESM 220b also includes a second power filter 210b which conditions the power provided on the negative (−) bus 240.

The system controller 202 includes at least a first voltage regulator 204a and a second voltage regulator 204b. The first voltage regulator 204a is a positive (+) bus voltage regulator and is configured to detect the current and voltage of the first power filter 210a. The second voltage regulator 204b is a negative (−) bus voltage regulator and is configured to detect the current and voltage of the second power filter 210b.

The trim command module 208 of FIG. 2 is coupled to the energy storage devices of the first HESM and the second HESM, and is configured to provide a command signal to the first and second voltage regulators 204a, 204b. The trim command module 208 is also configured to sense the current command signals provided from the voltage regulators 204a, 204b to the current allocators 206a, 206b. These signals are used to balance the HESMs and prevent the total system voltage from drifting to a voltage of the opposing energy storage device. The voltage regulators 204a, 204b are operated independently of one another and manage the bus voltage of their respective buses.

The trim command module 208 as shown is coupled to energy storage devices 212a, 214a which is an ultracapacitor and battery, respectively. In addition, the trim command module 208 is coupled to energy storage devices 212b, 214b, which is also an ultracapacitor and battery, respectively. The trim command module 208 is configured to control the charging and discharging of the energy storage devices 212, 214. The command trim module 208 is used to induce the operation (charge/discharge) of the energy storage devices 212, 214 based on the SoC of the energy storage devices 212, 214. In order to recharge the batteries, the voltage seen at the power filters 210a, 210b must be pulled down lower than the voltage of the aircraft bus, where the voltage adjust signal from the command trim module 208 is used. Conversely to discharge and/or source power, the voltage at the power filter must be above the voltage of the aircraft bus. The operation of the command trim module 208 regulates the SoC of the battery and ultracapacitor.

As a non-limiting example, the first bus 230 may operate between 0 to (+) 270 V and the second bus 240 may operate between (−) 270 to 0 V. In one or more embodiments of the invention, it should be understood the system controller can be implemented as individual controllers for controlling each channel having interfaces for communicating with other system controllers and/or a central system controller for balancing the channels to prevent the voltage from drifting to a single rail.

Now referring to FIG. 3, a flowchart 300 for regulating voltages of an HESM system in accordance with one or more embodiments is shown.

Block 302 includes sensing a first output of a first HESM coupled to a first bus, wherein the first HESM includes a plurality of energy storage devices. In one or more embodiments of the invention, the first HESM includes one or more different types of energy storage devices which provide power to a first bus, such as a positive voltage bus.

Block 304 includes sensing a second output of a second HESM coupled to a second bus, wherein the second HESM includes a plurality of energy storage devices, where the first bus and the second bus are different. Embodiments of the invention include a second HESM that provides power to a second bus, such as a negative voltage bus. It should be understood that other configurations are within the scope of the invention. For example, a different configuration and number of buses, HESMs, voltage regulators, etc. can be used.

Block 306 includes regulating the first and second buses based at least in part on sensing the first and second outputs. The first bus operates at a first voltage and the second bus operates at a second voltage which is different each other. This voltage regulation technique prevents the total voltage in the system from drifting to the highest voltage of an ESD.

The technical effects and benefits of the invention include balancing different buses coupled to respective HESMs to prevent the power from drifting to a single rail. These techniques not only increase the reliability of the electrically coupled systems but also increase the flexibility and efficiency of its application to ensure a steady voltage is provided for the connected devices.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for voltage regulation of a hybrid energy storage module (HESM), comprising:
   a system controller including a first voltage regulator and a second voltage regulator;
   a first HESM coupled to the system controller, wherein the first HESM is coupled to a first bus; and
   a second HESM coupled to the system controller, wherein the second HESM is coupled to a second bus, wherein the first bus and the second bus are different.

2. The system of claim 1, wherein the first HESM comprises one or more energy storage devices, one or more converters, and a first power filter; and
   wherein the second HESM comprises one or more energy storage devices, one or more converters, and a second power filter.

3. The system of claim 1, wherein the system controller includes a first and second voltage regulator, a first and second current allocator, and a trim command module, wherein the trim command module is coupled to the first voltage regulator and the second voltage regulator.

4. The system of claim 1, wherein the first voltage regulator regulates a voltage of the first bus independently of the second voltage regulator that regulates a voltage of the second bus.

5. The system of claim 1, wherein one or more energy storage devices of the first HESM include different energy storage types and one or more energy storage devices of the second HESM include different energy storage types.

6. The system of claim 1, wherein the first bus and the second bus are positive and negative rails of the system, respectively.

7. The system of claim 1, wherein a voltage of the first bus is different than a voltage of the second bus.

8. A method for regulating a voltage of a hybrid energy storage module (HESM) system, comprising:
   sensing a first output of a first HESM coupled to a first bus, wherein the first HESM comprises a plurality of energy storage devices;
   sensing a second output of a second HESM coupled to a second bus, wherein the second HESM comprises a plurality of energy storage devices, wherein the first bus and the second bus are different; and
   regulating the first and second buses based at least in part on sensing the first and second outputs.

9. The method of claim 8, wherein sensing the first output and the second output include sensing a current and voltage for the first output and the second output.

10. The method of claim 8, wherein regulating the first bus and second bus comprise sending a first signal to control one or more converters coupled to one or more energy storage devices of the first HESM and sending a second signal to control one or more converters coupled to one or more energy storage devices of the second HESM.

11. The method of claim 8, wherein the first bus is a positive rail and the second bus is a negative rail.

12. The method of claim 8, wherein the first bus is operating at a first voltage and the second bus is operating at a second voltage, wherein the first voltage is different than the second voltage.

13. The method of claim 8, wherein a first voltage regulator and a second voltage regulator receive commands from a common trim command module, wherein the commands are based on a state of charge of the plurality of energy storage devices of the first HESM and the second HESM.

14. The method of claim 13, wherein the commands of the command trim module are based on a state of charge of the plurality of energy storage devices and a current command signal.

15. A voltage regulator system of a hybrid energy storage module (HESM) system, comprising:
   a voltage regulator system having a first voltage regulator and a second voltage regulator, wherein the first voltage regulator comprises:
      an interface coupled to a first power filter;
      an interface coupled to a first current allocator; and
      an interface coupled to a trim module for receiving a voltage adjustment command; and
   wherein the second voltage regulator comprises:
      an interface coupled to a second power filter;
      an interface coupled to a second current allocator; and
      an interface coupled to the trim module to receive a voltage adjustment command.

16. The voltage regulator system of claim 15, wherein the first voltage regulator regulates an output of a first HESM and the second voltage regulator regulates an output of a second HESM.

17. The voltage regulator of claim 15, wherein the first HESM comprises a plurality of energy storage devices, a first power filter, and a first current allocator; and
   wherein the second HESM comprises a plurality of energy storage devices, a second power filter, and a second current allocator.

18. The voltage regulator of claim 15, wherein the plurality of energy storage devices for the first HESM and second HESM include different types of energy storage devices.

19. The voltage regulator system of claim 15, wherein the first voltage regulator regulates a positive rail voltage and the second voltage regulator regulates a negative rail voltage.

20. The voltage regulator system of claim 15, wherein the first voltage regulator regulates a first bus voltage of the first HESM independently of the second voltage regulator that regulates a second bus voltage of the second HESM.

\* \* \* \* \*